(12) United States Patent
Gehlhoff

(10) Patent No.: US 6,782,698 B2
(45) Date of Patent: Aug. 31, 2004

(54) STEERING CONTROL UNIT WITH LOW NULL BAND LOAD SENSING BOOST

(75) Inventor: Wade L. Gehlhoff, Savage, MN (US)

(73) Assignee: Eaton Corporation, Cleveland, OH (US)

( * ) Notice: Subject to any disclaimer, the term of this patent is extended or adjusted under 35 U.S.C. 154(b) by 46 days.

(21) Appl. No.: 10/255,453

(22) Filed: Sep. 26, 2002

(65) Prior Publication Data

US 2004/0060289 A1 Apr. 1, 2004

(51) Int. Cl.[7] ............................................. F16D 31/02
(52) U.S. Cl. ...................................................... 60/452
(58) Field of Search ........................ 60/452, 384, 450, 60/422, 426

(56) References Cited

U.S. PATENT DOCUMENTS

| | | | |
|---|---|---|---|
| 4,336,687 A | * 6/1982 | Morgan | 60/452 |
| 4,620,416 A | 11/1986 | Yip et al. | 60/384 |
| 5,136,844 A | 8/1992 | Stephenson et al. | 60/384 |
| 5,927,072 A | * 7/1999 | Vannette | 60/452 |

\* cited by examiner

Primary Examiner—Edward K. Look
Assistant Examiner—Michael Leslie
(74) Attorney, Agent, or Firm—L. J. Kasper

(57) ABSTRACT

A fluid controller (21) of the static load signal type which includes controller valving (25), a fluid inlet port (27), a control fluid port (33), a fluid return port (37), and a load signal port (39). The controller includes valving (25) which defines a neutral position (N) and an operating position (R), and further defines a variable load sense drain orifice, having a maximum flow area when the valving is in the neutral position and a decreasing flow area as the valving is displaced toward the operating position. The valving defines a variable load sense boost orifice (91) communicating from the inlet port (27) to the load signal port (39), the boost orifice having a maximum flow area when the valving is in neutral, and a decreasing flow area as the valving is displaced toward the operating position. The load sense drain orifice (93) is sized, relative to the boost orifice (91) to generate a static load signal (19) having a predetermined relationship to a predetermined standby pressure of the source (11) of pressurized fluid.

6 Claims, 6 Drawing Sheets

STEERING CONTROL UNIT WITH LOW NULL BAND LOAD SENSING BOOST

BACKGROUND OF THE DISCLOSURE

The present invention relates to fluid controllers, and more particularly, to fluid controllers which are of the static load signal type.

For many years, hydraulic circuits have been provided with "load sensing" capability, in which the primary control device (typically, a valve) of the circuit is provided with a primary flow control orifice, and the device communicates a load signal from a predetermined location in the device, generally downstream of the primary flow control orifice. The load signal is then utilized to control a device, such as a variable displacement pump, such that the fluid output of the pump varies in accordance with changes in the load signal. Load sensing technology has been especially useful, and commercially desirable, in hydraulic circuits used on vehicles in which the primary device generating the load signal is a hydrostatic power steering device, also referred to as a fluid controller or a steering control unit (SCU).

From the inception of load sensing technology, the load signals were typically "static", i.e., there was no actual fluid flow in the load signal circuit, but instead, the load signal being sensed was merely a static pressure. Subsequently, in order to improve response time of hydraulic circuits, and the various components of the circuit, those skilled in the art developed "dynamic" load signal technology, in which pressurized fluid is continually communicated into the load sensing circuit, and typically the dynamic signal fluid recombines with the main flow path, downstream of the main variable flow control orifice. An example of a dynamic load signal system is illustrated and described in U.S. Pat. No. 4,620,416, assigned to the assignee of the present invention and incorporated herein by reference.

Although dynamic load signal technology and devices have enjoyed widespread commercial success, and have been very satisfactory in performance, there are frequently applications for load sensing devices wherein providing the device with dynamic signal capability is not a viable option. For example, in the case of a load sensing SCU, if the SCU is to be part of an overall vehicle hydraulic system which has a load sensing pump as its source, and which includes a number of static load signal devices, then the SCU must also be a static load signal device. However, in many such situations, the vehicle OEM may have used dynamic load signal devices in some of its vehicles, and may have come to expect a certain level of performance (and especially, response time) from the hydraulic circuits utilized on its vehicles. Then, when the OEM is required (for the reasons noted above) to utilize a device which is of the static signal type, the performance is likely to be less than what the OEM has come to expect.

However, the assignee of the present invention has determined, in connection with the development of the present invention, that in certain hydraulic circuit applications, a static load signal SCU may be displaced from its neutral position all the way to a maximum displacement position before the load signal pressure in the circuit (and controlling the pump) builds up to a pressure level sufficient to cause the pump to provide the amount of fluid flow required to operate the steering circuit. When the above-described scenario occurs, much of the steering effort and movement of the steering wheel by the operator does not result in any substantial amount of turning of the steered wheels, thus appearing to the operator as at least a momentary loss of steering capability. The operator would rotate the steering wheel and the SCU valving would move to full valve displacement (deflection) until the mechanical stop would be engaged, after which the operator would, for a brief period, have only manual steering.

One potential, and seemingly obvious, solution to the above-described problem of slow response time in a static load sensing circuit is simply to increase the "standby" pressure generated by the pump. This may be done in any of several ways, one of which is to simply increase the spring force in the flow and pressure compensator of the pump which determines the flow and pressure output from the pump when the circuit being fed by the pump is not demanding any flow (i.e., is merely in a "standby" condition). However, in connection with the development of the present invention, it was determined that simply increasing the standby pressure of the pump did not appreciably improve the response time of the SCU.

BRIEF SUMMARY OF THE INVENTION

Accordingly, it is an object of the present invention to provide an improved fluid controller of the static signal type having substantially improved response time, in comparison to prior art static signal controllers.

The above and other objects of the invention are accomplished by the provision of a fluid controller operable to control the flow of fluid from a source of pressurized fluid to a fluid pressure operated device, the source of fluid including pressure responsive means for varying delivery of fluid to the controller in response to changes in a static load signal. The controller includes housing means defining an inlet port for connection to the source of fluid, a control fluid port for connection to the fluid pressure operated device, a fluid return port for connection to a reservoir, and a load signal port for connection to the pressure responsive means. Valve means is disposed in the housing means and defines a neutral position and an operating position providing fluid communication from the inlet port to the control fluid port. The pressure responsive means for varying delivery of fluid is selected to provide a predetermined standby pressure of the source of pressurized fluid. The valve means defines a variable load sense drain orifice communicating from the load signal port to the fluid return port, the load sense drain orifice having a maximum flow area when the valve means is in the neutral position, and a decreasing flow area as the valve means is displaced from the neutral position toward the operating position.

The improved fluid controller is characterized by the valve means defining a variable load sense boost orifice communicating from the inlet port to the load signal port. The load sense drain orifice is sized, relative to the load sense boost orifice, to generate the static load signal to have a predetermined relationship to the predetermined standby pressure of the source of pressurized fluid.

DETAILED DESCRIPTION OF THE PREFERRED EMBODIMENTS

Figure 1:
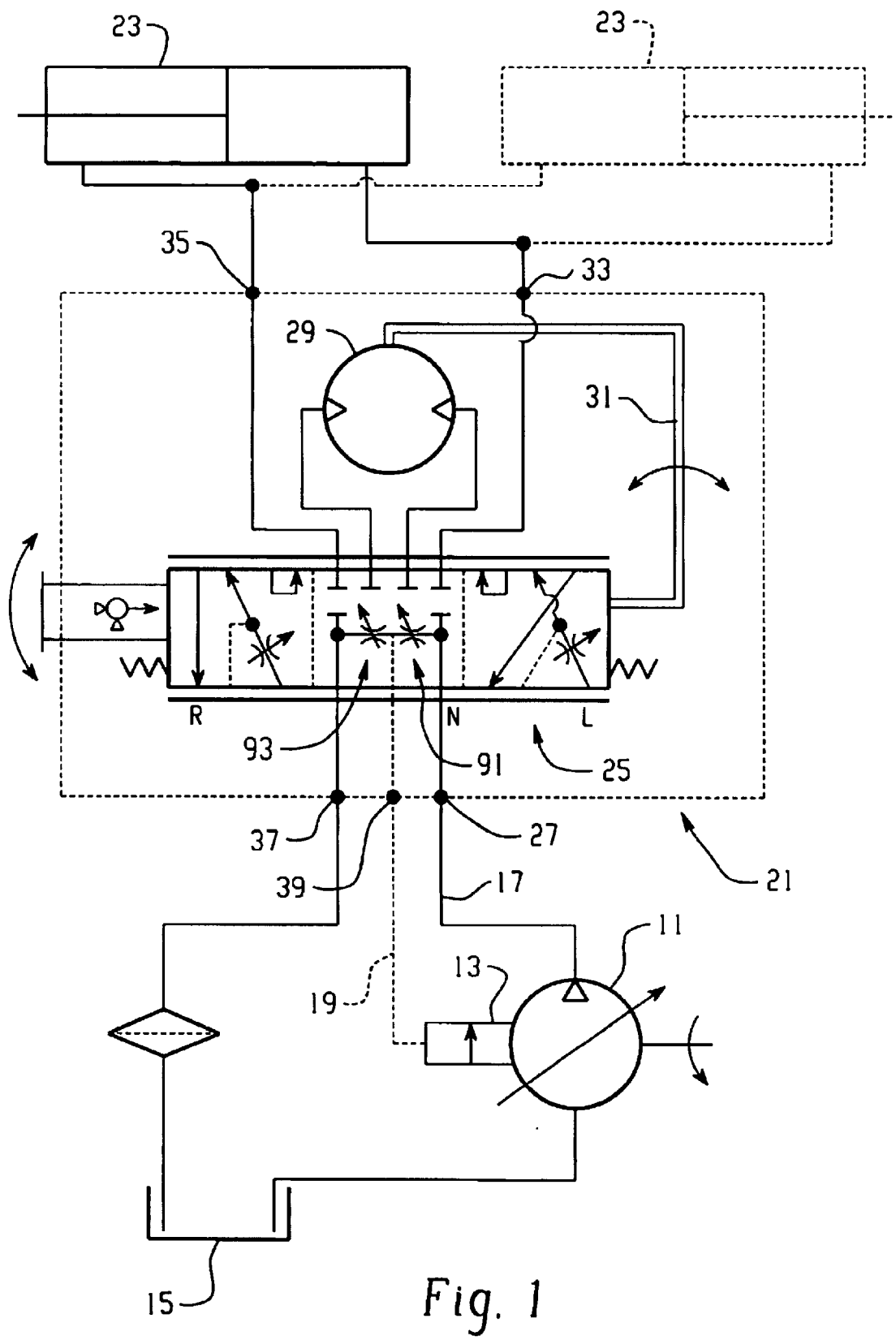
FIG. 1 is a hydraulic schematic of a hydrostatic power steering system of the static load sensing type, including a fluid controller made in accordance with the present invention.

Referring now to the drawings, which are not intended to limit the invention, FIG. 1 is a hydraulic schematic of a vehicle hydrostatic power steering system, including a fluid controller made in accordance with the present invention. The vehicle hydraulic system includes a source of pressurized fluid, shown in FIG. 1 as a load sensing pump 11 including a flow and pressure compensation section, generally designated 13, and also referred to hereinafter in the appended claims as a "pressure responsive means" for varying the delivery of fluid. The pump 11 has its inlet connected to a system reservoir 15. As is well know to those skilled in the art, the fluid pressure output of the pump 11 is variable in response to changes in the pump's own output pressure, present in an output conduit 17, and in response to a static load signal 19, which represents the demand for flow by the system.

Referring still primarily to FIG. 1, the vehicle hydraulic system includes a fluid controller, generally designated 21, which controls the flow of fluid from the pump 11, through the output conduit 17 to a pair of steering cylinders 23. Although there are two of the steering cylinders 23 shown in FIG. 1, those skilled in the art will understand that such is not essential to the present invention. The fluid controller 21, which will be described in greater detail subsequently, may be of the general type illustrated and described in the above-incorporated U.S. Pat. No. 4,620,416 as well as in U.S. Pat. No. 5,136,844, also assigned to the assignee of the present invention and incorporated herein by reference. Those skilled in the art will understand that the entire vehicle hydraulic system would typically include other devices (motors, cylinders, etc.), each controlled by its own valve or other control device, and as was mentioned in the BACKGROUND OF THE DISCLOSURE, the present invention would be especially advantageous in a hydraulic system in which each of those other devices is of the static load signal type.

Disposed within the fluid controller 21 is controller valving, generally designated 25, which is moveable from its neutral position (N) shown in FIG. 1 to either a right turn position (R) or a left turn position (L), either of which is considered a "normal operating position" for purposes of the subsequent description, and the appended claims. When the controller valving 25 is in either the right turn position (R) or the left turn position (L), pressurized fluid from the pump 11 flows through the output conduit 17 to a fluid inlet port 27, then flows through the controller valving 25, then flows through a fluid meter 29, one function of which is to measure (meter) the proper amount of fluid to be communicated to the steering cylinders 23. As is well know to those skilled in the art, the other function of the fluid meter 29 is to provide follow-up movement to the controller valving 25, by means of a mechanical follow-up mechanism, generally designated 31, such that the controller valving 25 is returned to its neutral position (N) after the desired amount of fluid has been communicated to the steering cylinders 23.

The metered fluid, after it flows through the fluid meter 29, again flows through the controller valving 25, and then flows to a control fluid port (cylinder port) 33. The metered fluid flows from the control fluid port 33 to the steering cylinders 23, causing the desired displacement of the cylinders 23, and resulting in a right turn. Fluid which is exhausted from the steering cylinders 23 flows to a control fluid port 35, and from there flows through the controller valving 25 to a return fluid port 37, and then to the system reservoir 15.

The fluid controller 21 also includes a load signal port 39, by means of which the static load signal 19 is communicated from the controller valving 25 back to the flow and pressure compensation section 13 of the pump 11.

Controller Valving 25

Figure 2:
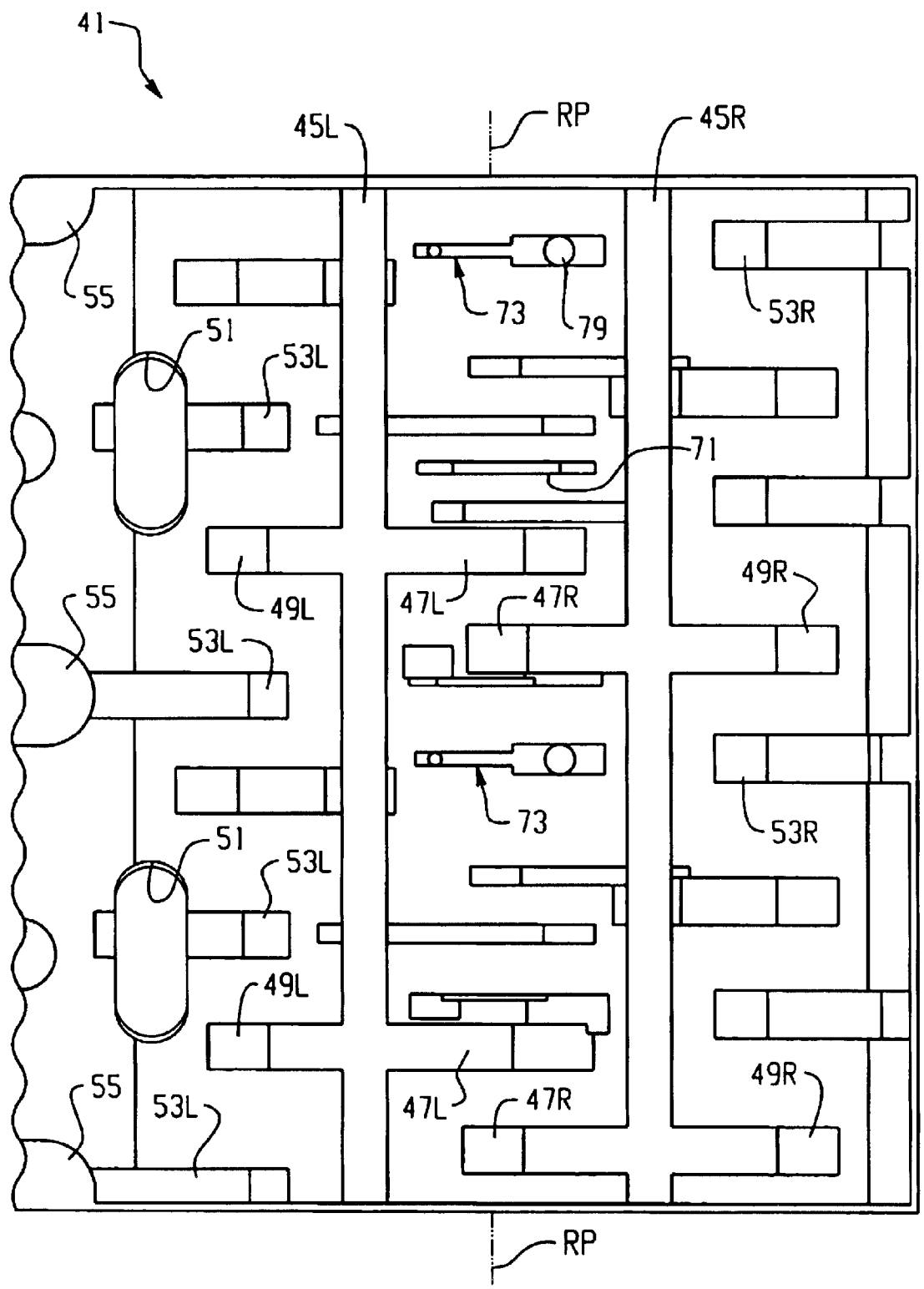
FIG. 2 is a fragmentary, layout, plan view of the primary valve member of the fluid controller shown schematically in FIG. 1, including the present invention.
Figure 3:
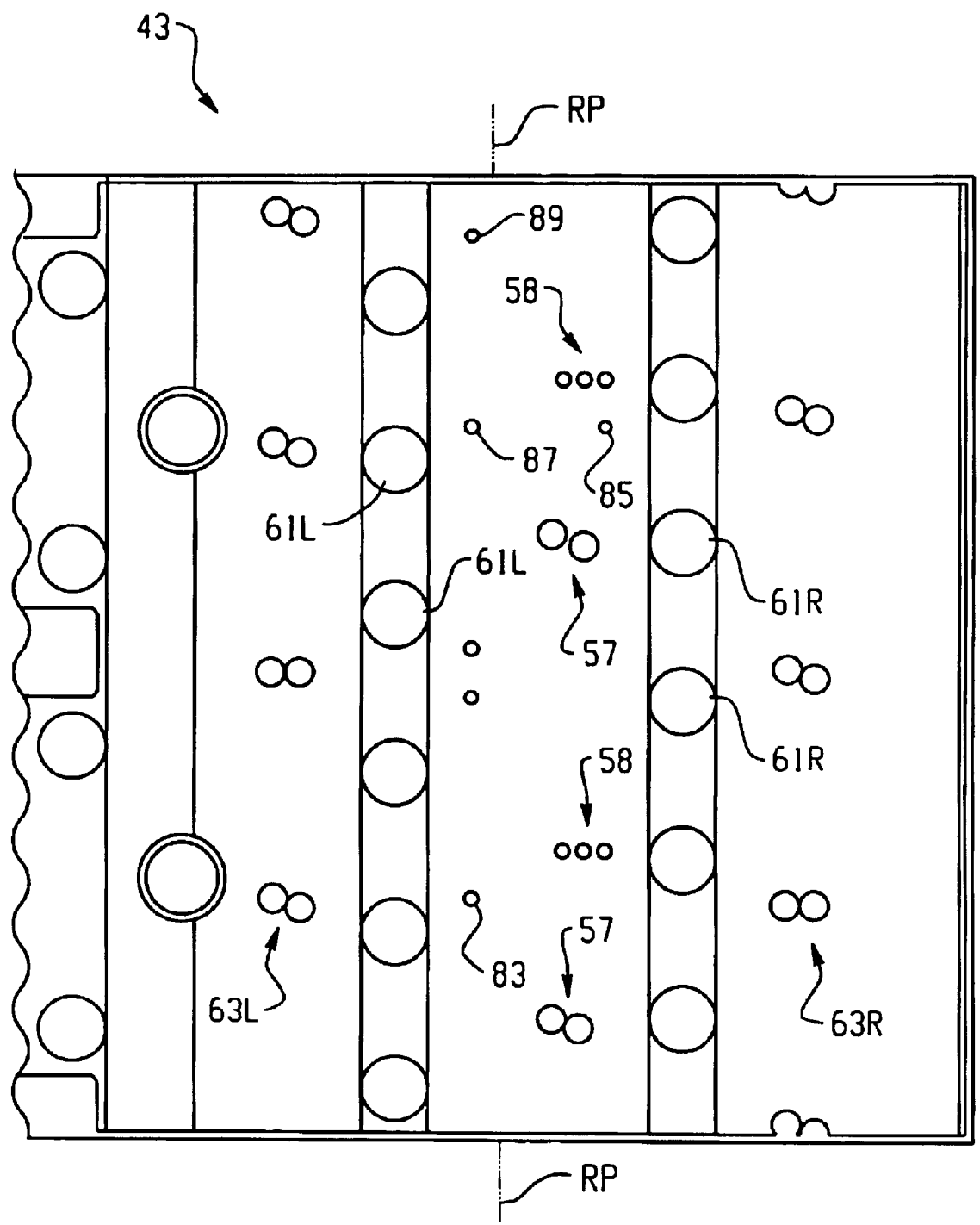
FIG. 3 is a fragmentary, layout, plan view of the follow-up valve member of the fluid controller shown schematically in FIG. 1, and on the same scale as FIG. 2.

Referring now primarily to FIGS. 2 and 3, it may be seen that the controller valving 25 includes, in the subject embodiment and by way of example only, a primary valve member 41 (see FIG. 2, also referred to as a "spool"), and a follow-up valve member 43 (see FIG. 3, also referred to as a "sleeve"). In connection with the subsequent description, it should be noted that many of the ports and passageways are arranged symmetrically with respect to a central reference plane RP, and such elements will be described by a reference numeral followed by either an L or an R to indicate that the particular element being described is physically located on either the left side or the right side, respectively of the reference plane RP. On the other hand, certain of the elements do not have a corresponding element oppositely disposed about the reference plane RP, and will be referred to by use of a reference numeral alone. It should be understood by those skilled in the art that the layout and overlay views of FIGS. 2 through 5 are intended to illustrate primarily the interface between the spool 41 and the sleeve 43, and as a result, may not show all of the various features which are present on the outer surface of the sleeve 43.

Referring now primarily to FIG. 2, the spool 41 defines a pair of circumferential meter grooves 45L and 45R, which are approximately equally and oppositely disposed about the reference plane RP. In fluid communication with the meter groove 45L is a pair of pressure passages 47L, and in fluid communication with the meter groove 45R is a pair of pressure passages 47R. Also in fluid communication with the meter groove 45L is a pair of operating passages 49L, and in fluid communication with the meter groove 45R is a pair of operating passages 49R. In addition to the above-described grooves and passages which are formed on the outer surface of the spool 41, the spool also defines a plurality of pin openings 51 which are in fluid communication with the interior of the spool 41. As is well known to those skilled in the art, the pin openings 51 receive opposite portions of a diametrally-oriented pin (not shown herein) which forms part of the follow-up mechanism 31. On the outer surface of the spool 41 is a plurality of tank passages 53L, two of which communicate with the openings 51, while the other two communicate with a pair of spring openings 55, the function of which is well know to those skilled in the art, and which communicate also with the interior of the spool 41. Also defined on the outer surface of the spool 41 is a plurality of tank passages 53R, the right ends of which also communicate with the interior of the spool 41, as do the pin openings 51 and the spring openings 55.

The sleeve 43 defines a plurality of pressure ports 57, which are disposed to be in continuous fluid communication with the inlet port 27 by means of an annular groove 59 (see FIGS. 4 and 5) defined by a housing H of the fluid controller 21. Also in fluid communication with the annular groove 59 are two sets of flow amplification ports 58 which are generally well know to those skilled in the art, and are not essential to the present invention. The functioning of the flow amplification ports 58, which are not essential to the present invention, will not be described in more detail subsequently.

Equally and oppositely disposed about the reference plane RP is a plurality of meter ports 61L, and a plurality of meter ports 61R, the meter ports 61L being in fluid communication with the meter groove 45L, and the meter ports 61R being in fluid communication with the meter groove 45R. The meter ports 61L and 61R are disposed for commutating fluid communication with bores 62L and 62R which are in fluid communication with the fluid meter 29 in a manner well know to those skilled in the art. Equally and oppositely disposed about the reference plane RP are sets of operating ports 63L and sets of operating ports 63R. Each of the operating ports 63L is in continuous fluid communication with the control fluid port 35, while each of the operating ports 63R is in continuous fluid communication with the fluid control port 33, both in a manner now well know to those skilled in the art, and which will not be illustrated or described in further detail herein.

Figure 4:
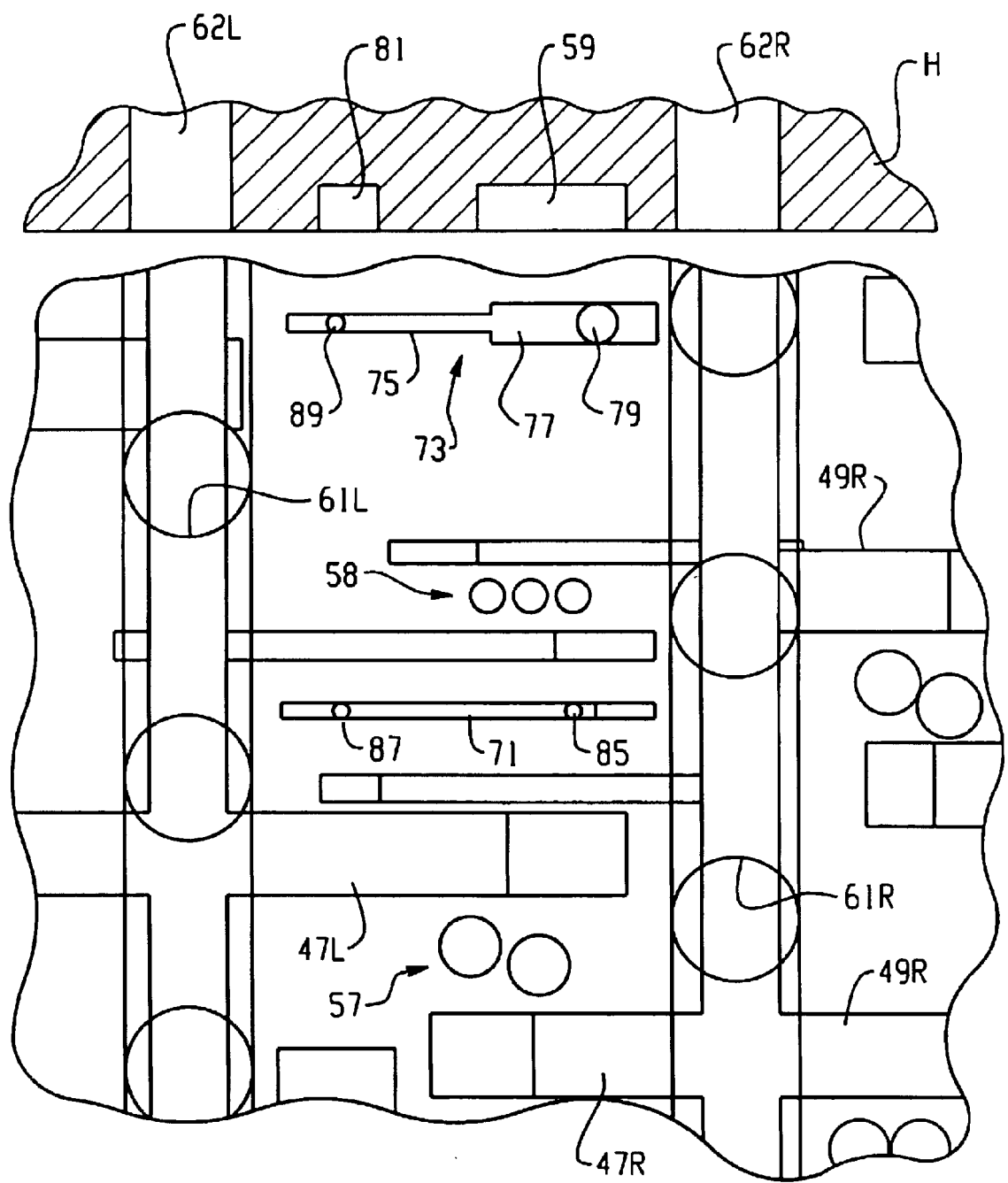
FIG. 4 is a further enlarged, fragmentary overlay view of the primary and follow-up valve members in their neutral position, and including a fragmentary cross-section of the controller housing.

What has been described so far in connection with FIGS. 2 and 3 is already conventional in the fluid controller art, and will be described further only briefly, in connection with the operation of the present invention. Referring again primarily to FIGS. 2 and 3, one important aspect of the present invention will now be described. On the outer surface of the spool 41 there is disposed an axially-oriented load sense boost slot 71 and a pair of load sense drain slots, generally designated 73. Referring now primarily to FIG. 4, each load sense drain slot 73 includes a relatively narrower slot portion 75 and a relatively wider slot portion 77. The slot portion 77 includes a drain port 79 which is able to communicate the drain slot 73 to the interior of the spool 41. As is well known to those skilled in the art, fluid disposed within the spool 41 is in relatively unrestricted fluid communication with the system reservoir 15.

Referring now primarily to FIGS. 3 and 4, the housing H of the fluid controller 21 includes an annular groove 81 which is in fluid communication with the load signal port 39. The annular groove 81 could also be formed on the outer surface of the sleeve 43, and the functional result would be the same, but because the views included herein do not show the outer surface of the sleeve 43, the groove 81 is being shown in the housing H. The sleeve 43 defines at least one port 83 (see FIG. 3) which is disposed to communicate a load pressure signal from the main fluid path of the fluid controller 21 to the annular groove 81, and from there to the load signal port 39 in a manner well known to those skilled in the art. The sleeve 43 also defines a boost port 85 which, as may best be seen in FIG. 4, is in open communication with the annular groove 59, and therefore, receives the same pressurized fluid as does the pressure ports 57. Disposed axially adjacent the boost port 85 is a boost port 87, disposed to be in fluid communication with the annular groove 81, the function of the boost ports 85 and 87 to be described subsequently. Finally, the sleeve 43 defines a drain port 89, also disposed to be in continuous fluid communication with the annular groove 81.

Figure 5:
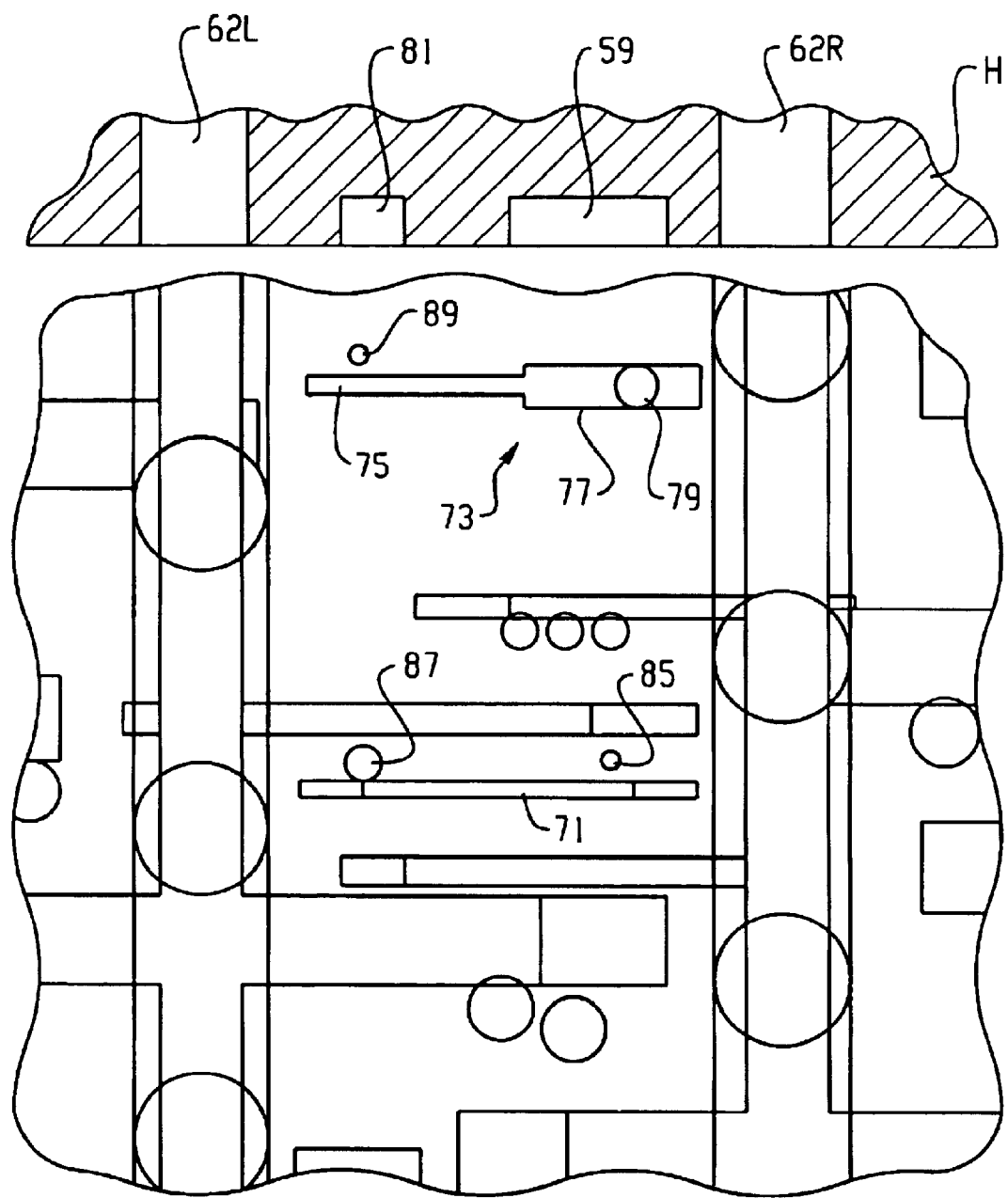
FIG. 5 is a fragmentary overlay view, similar to FIG. 4 and on the same scale as FIG. 4, but with the valve members displaced somewhat toward an operating position.
Figure 6:
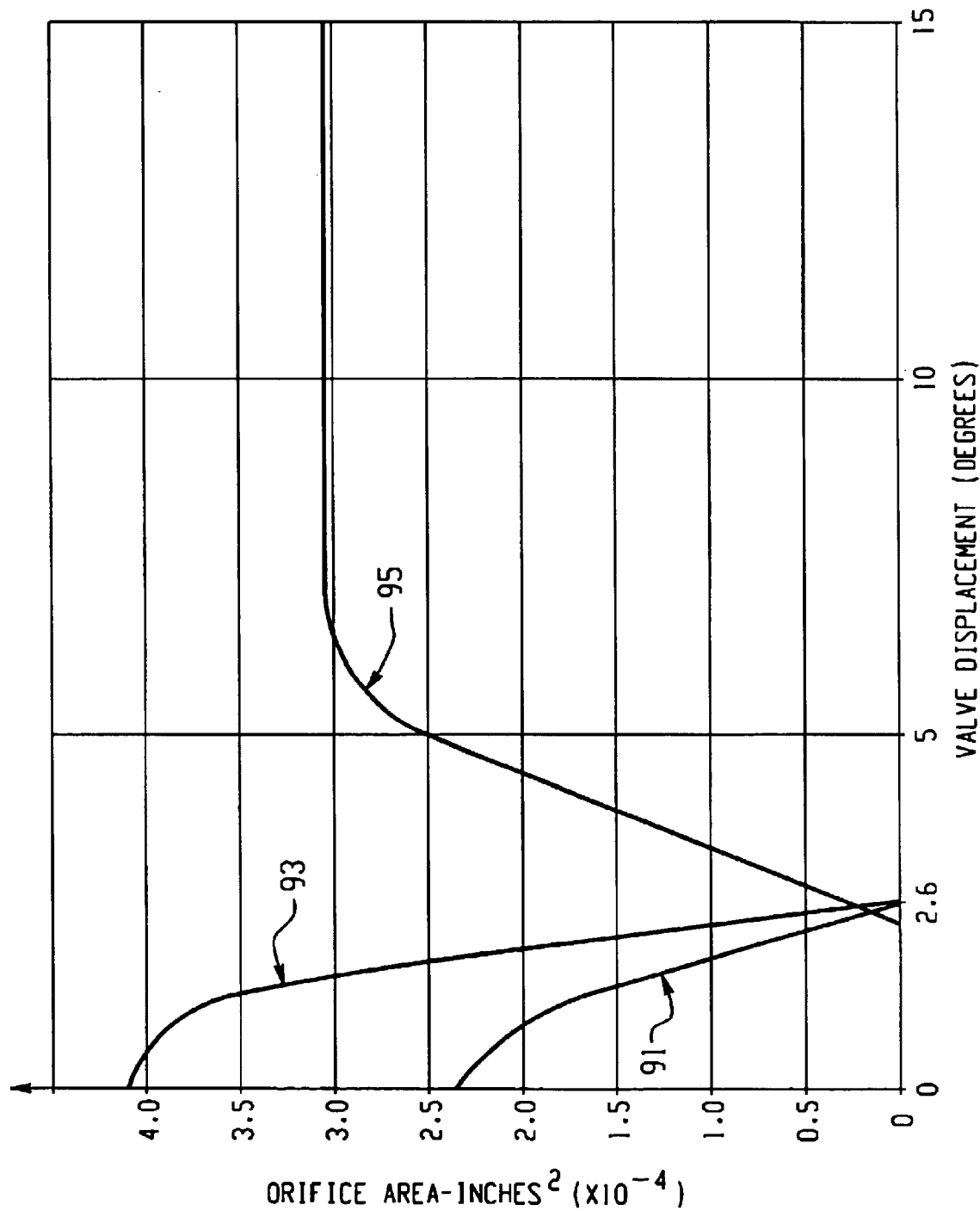
FIG. 6 is a graph of orifice area versus valve displacement, illustrating one important aspect of the present invention.

Referring now primarily to FIG. 4, in conjunction with FIG. 6, it may be seen that when the spool 41 and sleeve 43 are in their neutral position relative to each other (the neutral condition (N) as shown in FIG. 1), each of the boost ports 85 and 87 is directly centered over the load sense boost slot 71. At the same time, the drain port 89 is centered over, and in fluid communication with the narrower slot portion 75 of the load sense drain slot 73. Therefore, with the spool 41 and the sleeve 43 in the neutral position shown in FIG. 4, pressurized fluid is communicated from the inlet port 27 through the boost port 85 into the load sense boost slot 71, and then the pressurized fluid flows through the boost port 87 into the annular groove 81, as was described previously. Therefore, the cumulative overlap of the boost ports 85 and 87 and the boost slot 71 cooperate to define an equivalent, variable load sense boost orifice 91 (see FIG. 6). As may be seen by comparing FIGS. 4 and 5, the variable boost orifice 91 has a maximum flow area when the spool and sleeve are in the neutral position of FIG. 4, but as the operator begins to turn the steering wheel (not shown herein), displacing the spool 41 relative to the sleeve 43, the area of overlap of the boost ports 85 and 87, relative to the boost slot 71 decreases, until a displacement is reached (FIG. 5), in which the variable boost orifice 91 is closed (has a zero flow area). As may best be seen in FIG. 6, the orifice 91 closes, in the subject embodiment, at a valve displacement of about 2.6 degrees.

Similarly, the area of overlap of the drain port 89 and the narrower slot portion 75 (which is drained to tank through the drain port 79 as described previously), cooperates to define a variable load sense drain orifice, generally designated 93. As may best be seen by comparing FIGS. 4 and 5, the variable drain orifice 93 also has its maximum flow area when the spool 41 and sleeve 43 are in their neutral position, and a decreasing flow area as the controller valving 25 is displaced from the neutral position (N in FIG. 1) toward a right turn condition (R in FIG. 1), as shown in FIG. 5. Although not essential to the present invention, it is considered preferable that the variable drain orifice 93 closes (has a zero flow area) at the same time as the variable boost orifice 91 closes. Therefore, in the subject embodiment, both of the variable orifices 91 and 93 close at about 2.6 degrees.

As may best be seen in FIG. 2, there are two of the load sense drain slots 73 defined by the spool 41 and therefore, and as may best been seen in FIG. 6, the total flow area of the drain orifice 93 is substantially greater than the total flow area of the boost orifice 91. Subsequently, as the orifices 91 and 93 begin to close upon initiation of steering (displacement of the controller valving 25), the flow area of the drain orifice 93 remains greater than that of the boost orifice 91, and by approximately the same ratio, for reasons which will now be described. As is well known to those skilled in the fluid flow art, if the drain orifice 93 were smaller in flow area than the boost orifice 91, the result would be that the pressure of the static load signal 19 would be greater than the control pressure of the compensation section 13, and would reach the system relief setting as the orifice 93 approaches zero flow area, relative to the orifice 91.

Although, in the subject embodiment, and by way of example only, the boost orifice 91 and the drain orifice 93 are shown are remaining in an approximately fixed flow area ratio of about 2:1, with both closing at about 2.6 degrees, it should be understood that the present invention is not so limited. For example, at about 2.0 degrees or about 2.4 degrees, the flow area of the boost orifice 91 could stop decreasing and level off or even increase somewhat, in which case, the flow area of the drain orifice 93 would become less than that of the boost orifice 91 just before the valving reaches the 2.6 degree displacement. Such an arrangement would not result in the static load signal reaching the relief setting of the compensation section 13 because, as may best be seen in FIG. 6, at about 2.5 degrees of displacement, the controller valving 25 has provided an operating load sensing orifice 95, which communicates the load pressure present in the control port 33 to the load signal port 39. This load pressure in the port 39 comprises the static load signal 19.

In connection with the development of the present invention, it has been determined that the slow response time discussed in the background of the disclosure can be overcome by building and maintaining a static load signal 19 which is some predetermined percentage of the pump standby pressure. Therefore, and by way of example only, if the flow and pressure compensation section 13 of the pump 11 is designed to provide a predetermined standby pressure of 233 psi, the designer of the fluid controller 21 may determine empirically, that proper response time of the controller may be achieved with a static load signal of 100 psi for a total ("new") standby pressure of 333 psi (i.e., the load signal would be 30% of the "new" standby pressure). Based upon the known, available, predetermined standby pressure, and the required, predetermined static load signal, the slots 71 and 73 and the ports 85, 87 and 89 may be selected (in terms of their size and flow area) to achieve the desired static load signal, as a percentage of the given, predetermined standby pressure.

In order to better understand the relationship of the present invention to the known prior art, it should be pointed out that in a typical load sensing fluid controller of the type to which the invention applies, the load sense drain orifice would have a flow area, with the valving in the neutral position, of about $4 \times 10^{-3}$ in.$^2$, or a flow area about 10 times that of the drain orifice 93 of the present invention. Stated another way, the typical prior art load sense drain orifice was selected to provide almost a negligible pressure drop across the load sense drain orifice, whereas, in the case of the present invention, it is essential that the drain orifice 93 provide sufficient pressure drop to help generate, in conjunction with the boost orifice 91, the desired static load signal 19.

Furthermore, and by way of example and illustration only, the boost orifice 91, at neutral, has, in the subject embodiment, an orifice area of $2.5 \times 10^{-4}$ inches$^2$ (see FIG. 6), whereas in that same controller, the main variable flow control orifice, at about 6 degrees of deflection, has an orifice area of about $5 \times 10^{-3}$, or about 20 times the area of the boost orifice 91.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A fluid controller operable to control the flow of fluid from a source of pressurized fluid to a fluid pressure operated device, the source of fluid including pressure responsive means for varying delivery of fluid to said controller in response to changes in a static load signal; said controller including housing means defining an inlet port for connection to the source of fluid, a control fluid port for connection to the fluid pressure operated device, a fluid return port for connection to a reservoir, and a load signal port for connection to said pressure responsive means; valve means disposed in said housing means and defining a neutral position, and an operating position providing fluid communication from said inlet port to said control fluid port; said pressure responsive means for varying delivery of fluid being selected to provide a predetermined standby pressure of the source of pressurized fluid; and said valve means defining a variable load sense drain orifice communicating from said load signal port to said fluid return port, said load sense drain orifice having a maximum flow area when said valve means is in said neutral position, and a decreasing flow area as said valve means is displaced from said neutral position toward said operating position; characterized by:

(a) said valve means defining a variable load sense boost orifice communicating from said inlet port to said load signal port; and (b) said load sense drain orifice being sized, relative to said load sense boost orifice, to generate said static load signal to have a predetermined relationship to said predetermined standby pressure of the source of pressurized fluid.

2. A fluid controller as claimed in claim 1, characterized by said load sense boost orifice having a maximum flow area when said valve means is in said neutral position and a decreasing flow area as said valve means is displaced from said neutral position toward said operating position.

3. A fluid controller as claimed in claim 2, characterized by said load sense drain orifice decreasing to a zero flow area when said valve means is displaced from said neutral position by about X degrees, and said load sense boost orifice decreasing to a zero flow area when said valve means is displaced from said neutral position by about X degrees, said valve means defining an operating load sensing orifice which begins to open when said valve means is displaced from said neutral position by slightly less than about X degrees.

4. A fluid controller as claimed in claim 1, characterized by the source of pressurized fluid, and said pressure responsive means for varying delivery of fluid comprising a flow and pressure compensated variable displacement pump.

5. A fluid controller as claimed in claim 2, characterized by said maximum flow area of said load sense drain orifice being substantially greater than said maximum flow area of said load sense boost orifice, when said valve means is in said neutral position.

6. A fluid controller as claimed in claim 5, characterized by said flow area of said load sense drain orifice remaining substantially greater than said flow area of said load sense boost orifice as said valve means is displaced from said neutral position (N) toward said operating position.

* * * * *